(12) United States Patent
Yang et al.

(10) Patent No.: US 9,327,277 B2
(45) Date of Patent: May 3, 2016

(54) FIBROUS IM-5 MOLECULAR SIEVE AND PREPARATION PROCESS THEREOF

(71) Applicants: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

(72) Inventors: Weiya Yang, Liaoning (CN); Fengxiang Ling, Liaoning (CN); Shaojun Wang, Liaoning (CN); Zhiqi Shen, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

( * ) Notice: Subject to any disclaimer, the term of this patent is extended or adjusted under 35 U.S.C. 154(b) by 94 days.

(21) Appl. No.: 14/356,725

(22) PCT Filed: Oct. 30, 2012

(86) PCT No.: PCT/CN2012/001473
§ 371 (c)(1),
(2) Date: May 8, 2014

(87) PCT Pub. No.: WO2013/067764
PCT Pub. Date: May 16, 2013

(65) Prior Publication Data
US 2014/0323288 A1    Oct. 30, 2014

(30) Foreign Application Priority Data
Nov. 10, 2011   (CN) .......................... 2011 1 0353591

(51) Int. Cl.
| | | |
|---|---|---|
| *B01J 29/70* | (2006.01) | |
| *C01B 39/40* | (2006.01) | |
| *C01B 39/48* | (2006.01) | |
| *B01J 35/00* | (2006.01) | |
| *B01J 35/02* | (2006.01) | |

(52) U.S. Cl.
CPC ............... *B01J 29/70* (2013.01); *B01J 35/002* (2013.01); *B01J 35/023* (2013.01); *B01J 35/026* (2013.01); *C01B 39/40* (2013.01); *C01B 39/48* (2013.01); *C01P 2004/10* (2013.01); *C01P 2004/54* (2013.01); *C01P 2004/61* (2013.01); *C01P 2004/62* (2013.01)

(58) Field of Classification Search
CPC ..... C01B 39/48; C01B 39/40; C01P 2004/10; C01P 2004/54; C01P 2004/61; C01P 2004/62; B01J 29/70; B01J 35/002; B01J 35/023; B01J 35/026
See application file for complete search history.

(56) References Cited

U.S. PATENT DOCUMENTS

| | | | | | |
|---|---|---|---|---|---|
| 6,136,290 | A | * | 10/2000 | Benazzi ................... | B01J 29/04 208/120.01 |
| 7,276,224 | B2 | * | 10/2007 | Zachariah .............. | B82Y 30/00 423/508 |
| 7,972,432 | B2 | * | 7/2011 | Guynn .................... | C04B 28/02 106/705 |
| 2014/0287910 | A1 | * | 9/2014 | Ling ....................... | C01B 39/48 502/8 |

FOREIGN PATENT DOCUMENTS

| | | |
|---|---|---|
| CN | 1234012 A | 11/1999 |
| CN | 1249270 A | 4/2000 |
| CN | 101862669 A | 10/2010 |
| EP | 0946416 B1 | 2/2002 |

OTHER PUBLICATIONS

Lingdong Kong, et al. "Synthesis of small crystal zeolite beta in a biphasic H2O-CTAB-alcohol system." Materials Letters, vol. 63 (2009), pp. 343-345.
A. Corma, et al. "Determination of the Pore Topology of Zeolite IM-5 by Means of Catalytic Test Reactions and Hydrocarbon Adsorption Measurements." Journal of Catalysis, vol. 189 (2000), pp. 382-394.
Song-Ho Lee, et al. "Synthesis, characterization, and catalytic properties of zeolites IM-5 and NU-88." Journal of Catalysis, vol. 215 (2003), pp. 151-170.
Avelino Corma, et al. "IM-5: A Highly Thermal and Hydrothermal Shape-Selective Cracking Zeolite." Journal of Catalysis, vol. 206 (2002), pp. 125-133.
Kazuyuki Iwakai, et al. "Preparation of nano-crystalline MFI zeolite via hydrothermal synthesis in water/surfactant/organic solvent using fumed silica as the Si source." Microporous and Mesoporous Materials, vol. 141 (2011), pp. 167-174.
Lei Wang et al. "A facile method for the fabrication of IM-5 hollow zeolite sphere in emulsion system," Microporous and Mesoporous Materials, 163 (2012) 243-248.
Chen Xiaogang et al. "IM-5 Zeolite Hollow Spheres: Synthesis and Characterization," Chemical Engineering of Oil & Gas, Jun. 7, 2012 issue, pp. 1-7, ISSN: 1007-3426.
Lei Wang et al. "Synthesis of nano-zeolite IM-5 by hydrothermal method with the aid of PEG and CTAB," Materials Letters, 69 (2012) 16-19.

* cited by examiner

*Primary Examiner* — David M Brunsman
(74) *Attorney, Agent, or Firm* — Novick, Kim & Lee, PLLC; Allen Xue

(57) ABSTRACT

The present invention provides a fibrous IM-5 molecular sieve and the preparation process thereof. According to the process according to the present invention, by adding an appropriate amount of a quaternary ammonium salt with a long carbon chain to the preparation system so as to occur a synergistic action with the organic templet agent, an IM-5 molecular sieve which would be otherwise a rodlike form is converted into the fibrous form. The IM-5 molecular sieve according to the present invention has an aspect ratio greater than that of the rodlike IM-5 molecular sieve obtained according to the prior art, such that the proportion of the exposed periphery crystal face is higher, which benefit to increasing the selectivity of the catalytic reaction for the corresponding crystal face.

19 Claims, 2 Drawing Sheets

FIBROUS IM-5 MOLECULAR SIEVE AND PREPARATION PROCESS THEREOF

TECHNICAL FIELD

The present invention relates to a fibrous IM-5 molecular sieve and the preparation process thereof, and thus belongs to the field of preparing an inorganic material.

BACKGROUND

The microporous molecular sieve material has regular pore structures and a large surface area, thus is widely used in the fields of adsorption, separation, chemical engineering, catalysis and the like. In recent years, some new structures of molecular sieve materials have been prepared continuously.

IM-5 molecular sieve is a new zeolite prepared using a bi-quaternary ammonium salt as the templet agent. The IM-5 molecular sieve has a pore-passage structure similar to that of ZSM-5, has a two dimensional 10MR crossing pore structure, and has relatively high thermal stability and hydrothermal stability. Thus the ZSM-5 has a broad prospect of application for catalysis in the petrochemical fields of paraffin cracking, isomerization of n-butylene, preparation of gasoline from Synthesis Gas and the like.

Journal of Molecular Catalysis A: Chemical, 2000, 162: 175-189 Discloses to obtain an IM-5 molecular sieve from crystallization for 10 days using 1,1-(pentamethylene) bis-(1-methylpyrrolidinium) bromide as the templet agent, under the condition of adding a promoter of sodium bromide and static hydrothermal conditions at a temperature of 175 degrees C.

Journal of Catalysis 215 (2003) 151-170 discloses to obtain an IM-5 molecular sieve from crystallization for 14 days using 1,1-(pentamethylene) bis-(1-methylpyrrolidinium) bromide as the templet agent, under the dynamic hydrothermal condition at a temperature of 160 degrees C.

CN1234012A discloses an IM-5 molecular sieve and the preparation process thereof. The IM-5 molecular sieve is obtained with high crystallinity from hydrothermal crystallization for 8 days at a temperature of 170 degrees C. by adding additional NU-88 powder as a seed crystal.

By studying the IM-5 products prepared according to the documents above, it can be seen that the IM-5 molecular sieves prepared from prior arts have an morphology of two dimensional rodlike form with a diameter of generally 50 nm or more and an aspect ratio of generally about 5. Regarding a two dimensional rodlike molecular sieve, the aspect ratio determines the proportional relation between the crystal face in the radial direction and the crystal face in the axial direction. The more the aspect ratio is, the more the area of the periphery crystal face, and correspondingly the less the area of the sectional plane crystal face. It is currently known that a certain crystal face of a crystalline material has specific reactivity, such that the more the crystal face exposes, the higher the corresponding reaction selectivity. Therefore, by controlling the proportional relation between the periphery crystal face and the sectional crystal face through the aspect ratio of the two dimensional rodlike molecular sieve, the reaction selectivity of the corresponding crystal face can be increased.

SUMMARY OF THE INVENTION

The present invention provides a fibrous IM-5 molecular sieve and the preparation process thereof. According to the process of the present invention, a fibrous IM-5 molecular sieve can be prepared by adding a cationic surfactant to the reaction system so as to occur a synergistic action with the organic templet agent.

The IM-5 molecular sieve according to the present invention is in the fibrous form. The fibrous IM-5 molecular sieve has an average diameter of about 5-about 30 nm, preferably not less than about 6 nm, not less than about 7 nm, not less than about 8 nm, not less than about 9 nm, or not less than about 10 nm; and preferably not more than about 29 nm, not more than about 28 nm, not more than about 27 nm, not more than about 26 nm, or not more than about 25 nm. The average aspect ratio is about 15-about 100, preferably not less than about 16, not less than about 17, not less than about 18, not less than about 19, or not less than about 20; and preferably not more than about 90, not more than about 80, not more than about 70, not more than about 60, or not more than about 50. For example, the average diameter is preferably about 10-about 25 nm, and/or the average aspect ratio is preferably about 20-about 50.

The fibrous IM-5 molecular sieve according to the present invention has an average length of about 100-about 3000 nm, preferably not less than about 120 nm, not less than about 140 nm, not less than about 160 nm, not less than about 180 nm, or not less than about 200 nm; and preferably not more than about 2500 nm, not more than about 2000 nm, not more than about 1750 nm, not more than about 1500 nm, or not more than about 1250 nm. For example, the average length is preferably about 200-about 1250 nm.

The process of preparing the fibrous IM-5 molecular sieve according to the present invention comprises:

(1) mixing an alkali source, a templet agent, an aluminum source, water, a silicon source and a cationic surfactant homogeneously, and stirring the mixture at a suitable temperature to generate a sol; and (2) elevating the temperature of the mixture of step (1) in a hydrothermal reactor to about 140-about 200 degrees C., after hydrothermal crystallization of about 2-about 15 days, taking out and separating the solid product, drying and calcinating to obtain an IM-5 molecular sieve in the fibrous form.

In step (1), the temperature for stirring is about 20-about 70 degrees C., preferably about 55-about 65 degrees C. The duration of stirring is about 1-about 24 hours, preferably about 3-about 12 hours.

In step (1), the templet agent is 1,1'-(pentamethylene) bis (1-methylpyrrolidinium), having a structural formula of:

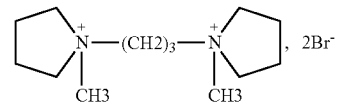

The aluminum source is aluminum nitrate, aluminum chloride, aluminum sulfate, or a combination the thereof, preferably aluminum nitrate. The alkali source is sodium hydroxide, potassium hydroxide, lithium hydroxide or the combination thereof, preferably sodium hydroxide. The silicon source is white carbon, silicic acid, silanolate, silica sol, silica gel, or a combination thereof, preferably white carbon. The surfactant is one or more cationic quaternary ammonium salt having a carbon chain of 12-16 carbon atoms, and the corresponding negative ion is a bromide ion or chloride ion, preferably bromide ion. The cationic quaternary ammonium salt having a carbon chain of 12-16 carbon atoms includes, but not limited to, cetyl trimethylammonium bromide, myristyl trimethylammonium bromide, and dodecyl trimethylammonium bromide.

In step (1), the molar ratios calculated based on the following species for the various components of the reaction mixture are:

$SiO_2/Al_2O_3$ of about 40-about 70, preferably of about 50-about 70;

$R/SiO_2$ of about 0.15-about 0.4, preferably about 0.15-about 0.3, R representing the templet agent;

$H_2O/SiO_2$ of about 30-about 70, preferably of about 40-about 60;

$OH^-/SiO_2$ of about 0.6-about 0.8, preferably about 0.70-about 0.75; and $R/SUR^+$ of about 5-about 20, preferably not less than about 6, not less than about 7, or not less than about 8; and preferably not more than about 19, not more than about 18, not more than about 17, or not more than about 16; for example, the ratio is preferably about 8-about 16, wherein the SUR+ represents the cationic surfactant.

In step (2), the temperature for the hydrothermal crystallization is about 160-about 185 degrees C., more preferably about 165-about 175 degrees C.; and the duration of the hydrothermal crystallization is about 7-about 12 days.

The IM-5 molecular sieve according to the present invention has an aspect ratio greater than that of the rodlike IM-5 molecular sieve obtained according to the prior art, such that the proportion of the exposed periphery crystal face is higher, which benefits to increasing the selectivity of the catalytic reaction for the corresponding crystal face. Meanwhile, the diameter of the molecular sieve having a large aspect ratio prepared according to the invention is less than the diameter of the IM-5 obtained according the prior art, and reaches to the nano-scale, which is then more beneficial for the mass transfer in the radial direction, such that the reactivity and selectivity of the periphery crystal face can be further increased.

EMBODIMENTS

Figure 1:
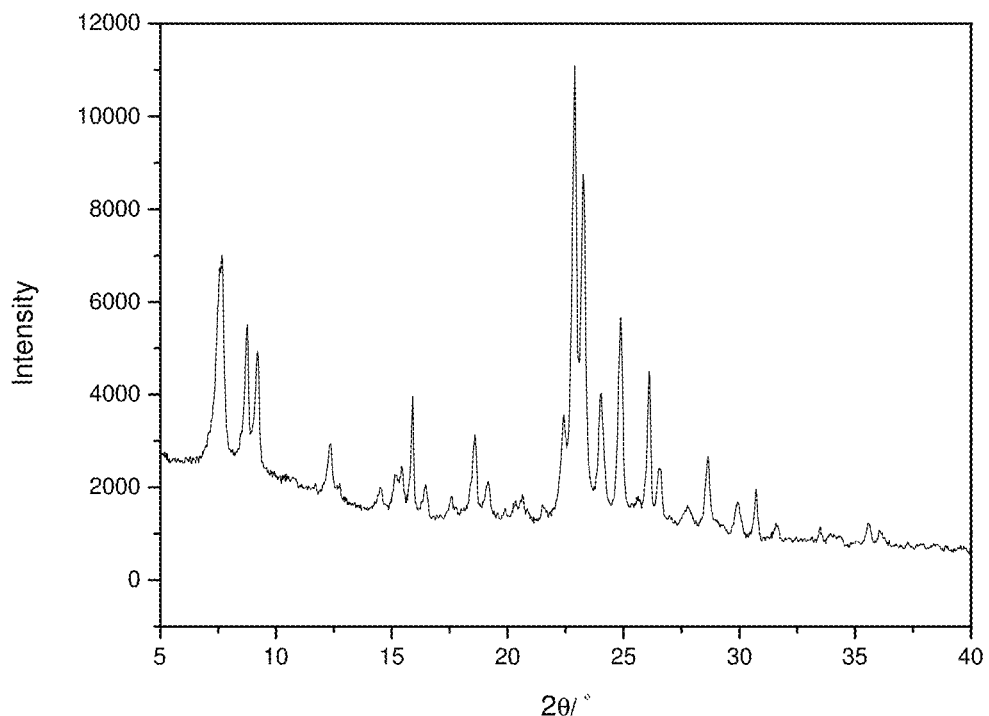
FIG. 1 is a XRD curve of the fibrous IM-5 molecular sieve prepared according to Example 1 of the present invention.
Figure 2:
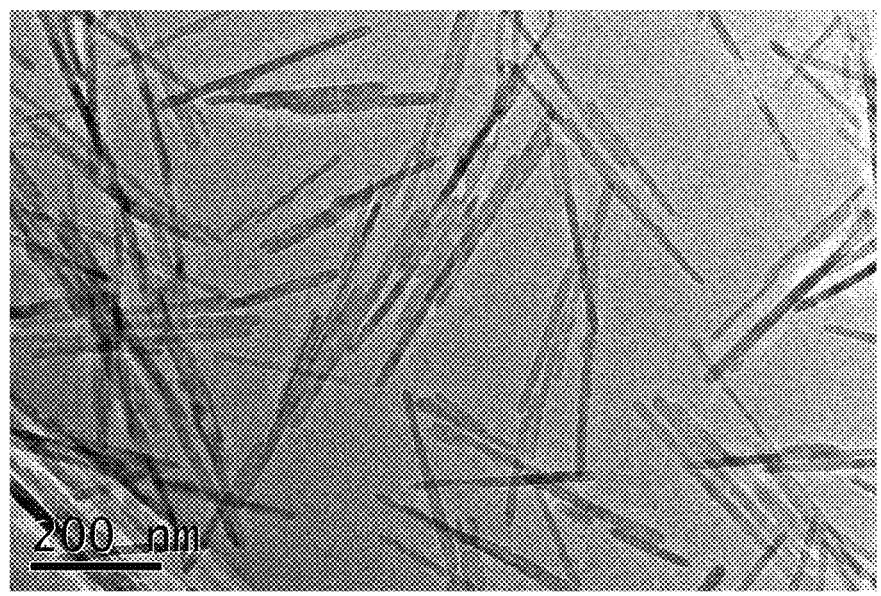
FIG. 2 is a transmission electron micrograph of the fibrous IM-5 molecular sieve prepared according to Example 1 of the present invention.
Figure 3:
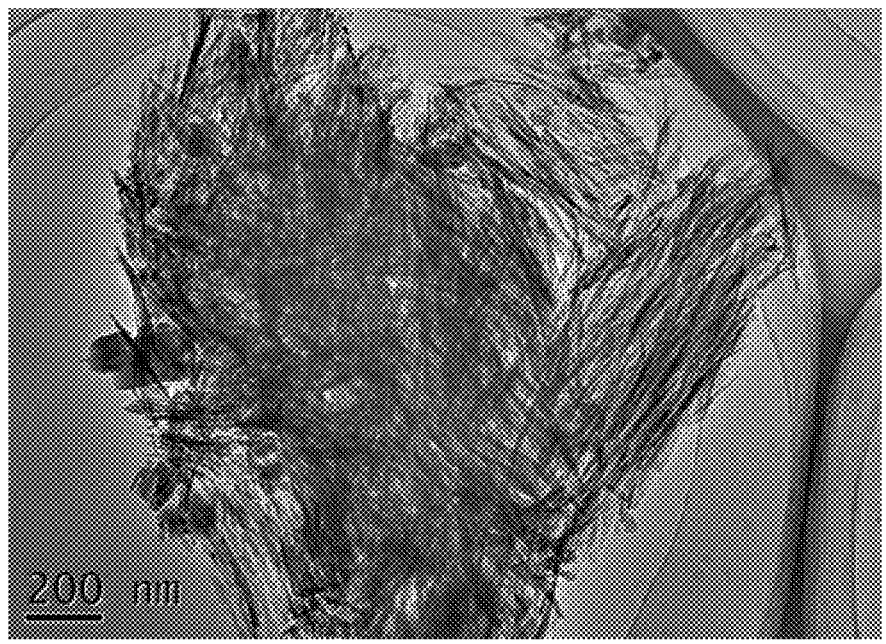
FIG. 3 is a transmission electron micrograph of the fibrous IM-5 molecular sieve prepared according to Example 2 of the present invention.
Figure 4:
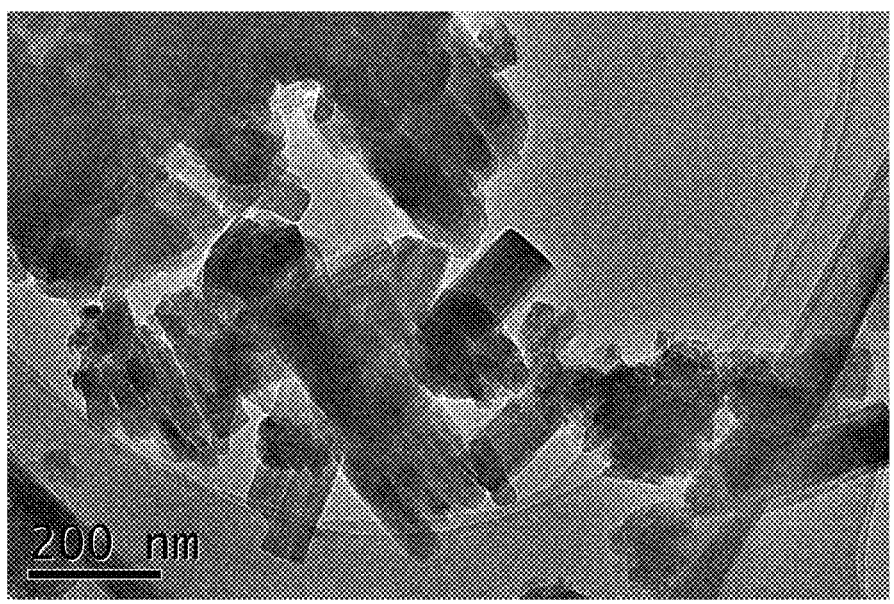
FIG. 4 is a transmission electron micrograph of a conventional IM-5 molecular sieve prepared according to Comparative Example 1 provided by the present invention.

In the present invention, the length and diameter of the fibrous molecular sieve are measured according the method as follows. The diameter and length of the fibrous molecular sieve are measured with a transmission electron microscope. 20 transmission electron micrographs are taken randomly, from which the diameter and length of the fibrous molecular sieve are measured using an image processing software, Image J. The lengths and diameters of at least 5 fibers that can be displayed integrally on each image are measured, so as to obtain the aspect ratio with the length and diameter data.

Average length=the sum of the lengths of all the fibers measured/the total number of the fibers Average diameter=the sum of the diameters of all the fibers measured/the total number of the fibers Average aspect ratio=the sum of the aspects of all the fibers measured/the total number of the fibers The embodiments and effects of the present invention will be further illustrated below with Examples.

In the examples, the transmission electron microscope (TEM) is manufactured by JEOL Ltd., with a model of JEM 2100 (HR), an accelerating voltage of 200 KV, and a resolution of 0.23 nm.

Example 1

Sodium hydroxide, 1,1'-(pentamethylene) di-(1-methylpyrrolidinium) bromide, aluminum nitrate, water, white carbon and cetyl trimethylammonium bromide (CTAB) were mixed at a room temperature, according to molar ratios calculated based on the following species as follows: $SiO_2/Al_2O_3=55$, $OH^-/SiO_2=0.73$, $R/SiO_2=0.2$, $H_2O/SiO_2=50$, and R/CTAB=8.

The mixture obtained was then stirred in a water bath at a temperature of 60 degrees C. to be a homogeneous sol, which sol was kept at the constant temperature for 5 hours with stirring for pre-gelation. Subsequently, the gel was transferred into a hydrothermal reactor, heated to 165 degrees C., hydrothermal crystallized for 11 days, then cooled naturally, filtered and dried to provide a molecular sieve coarse powder. By the XRD measurement, the products obtained were all well crystallized fibrous IM-5 molecular sieve, which were observed for the morphology with the TEM at low range, having an average diameter of 13 nm, an average length of 357 nm, and an average aspect ratio of 27.5.

Example 2

Sodium hydroxide, 1,1'-(pentamethylene) di-(1-methylpyrrolidinium) bromide, aluminum nitrate, water, white carbon and cetyl trimethylammonium bromide (CTAB) were mixed at a room temperature, according to molar ratios calculated based on the following species as follows: $SiO_2/Al_2O_3=55$, $OH^-/SiO_2=0.73$, $R/SiO_2=0.2$, $H_2O/SiO_2=50$, and R/CTAB=11.

The mixture obtained was then stirred in a water bath at a temperature of 60 degrees C. to be a homogeneous sol, which sol was kept at the constant temperature for 5 hours with stirring for pre-gelation. Subsequently, the gel was transferred into a hydrothermal reactor, heated to 165 degrees C., hydrothermal crystallized for 11 days, then cooled naturally, filtered and dried to provide a molecular sieve coarse powder. By the XRD measurement, the products obtained were all well crystallized fibrous IM-5 molecular sieve, which were observed for the morphology with the TEM at low range, having an average diameter of 12 nm, an average length of 550 nm, and an average aspect ratio of 24.

Example 3

Sodium hydroxide, 1,1'-(pentamethylene) di-(1-methylpyrrolidinium) bromide, aluminum nitrate, water, white carbon and cetyl trimethylammonium bromide (CTAB) were mixed at a room temperature, according to molar ratios calculated based on the following species as follows: $SiO_2/Al_2O_3=55$, $OH^-/SiO_2=0.71$, $R/SiO_2=0.27$, $H_2O/SiO_2=60$, and R/CTAB=10.

The mixture obtained was then stirred in a water bath at a temperature of 65 degrees C. to be a homogeneous sol, which sol was kept at the constant temperature for 10 hours with stirring for pre-gelation. Subsequently, the gel was transferred into a hydrothermal reactor, heated to 165 degrees C., hydrothermal crystallized for 11 days, then cooled naturally, filtered and dried to provide a molecular sieve coarse powder. By the XRD measurement, the products obtained were all well crystallized fibrous IM-5 molecular sieve, which were observed for the morphology with the TEM at low range, having an average diameter of 17 nm, an average length of 700 nm, and an average aspect ratio of 38.

Example 4

Sodium hydroxide, 1,1'-(pentamethylene) di-(1-methylpyrrolidinium) bromide, aluminum nitrate, water, white carbon and dodecyl trimethylammonium bromide(DTAB) were mixed at a room temperature, according to molar ratios calculated based on the following species as follows: $SiO_2/Al_2O_3=68$, $OH^-/SiO_2=0.75$, $R/SiO_2=0.15$, $H_2O/SiO_{2=45}$, and $R/DTAB=16$.

The mixture obtained was then stirred in a water bath at a temperature of 60 degrees C. to be a homogeneous sol, which sol was kept at the constant temperature for 10 hours with stirring for pre-gelation. Subsequently, the gel was transferred into a hydrothermal reactor, heated to 175 degrees C., hydrothermal crystallized for 7 days, then cooled naturally, filtered and dried to provide a molecular sieve coarse powder. By the XRD measurement, the products obtained were all well crystallized fibrous IM-5 molecular sieve, which were observed for the morphology with the TEM at low range, having an average diameter of 24 nm, an average length of 1050 nm, and an average aspect ratio of 43.

Comparative Example 1

An IM-5 molecular sieve was prepared referring to the process disclosed by Journal of Catalysis 215 (2003) 151-170. The raw materials, ratios and reaction temperature were same as example 1, except that the raw material mixture was not added with the cetyl trimethylammonium bromide, but, instead, transferred directly and respectively to the hydrothermal reactor after the homogeneous stirring, so as to carry out a hydrothermal crystallization for 11 days at a temperature of 165 degrees C. By the XRD measurement, the products obtained were conventional rodlike IM-5, which were conventional rodlike crystal grains of IM-5 measured by TEM, having typically a particle diameter of about 111 nm, a length of about 428 nm, and an aspect ratio of about 3.9.

The invention claimed is:

1. An IM-5 molecular sieve, wherein the IM-5 molecular sieve is in a fibrous form, having an average diameter of about 5-about 30 nm and an average aspect ratio of about 15-about 100.

2. The IM-5 molecular sieve according to claim 1, wherein an average length of the fibrous IM-5 molecular sieve is about 100-about 3000 nm.

3. The IM-5 molecular sieve according to claim 2, wherein the average length of the fibrous IM-5 molecular sieve is about 200-about 1250 nm.

4. The IM-5 molecular sieve according to claim 1, wherein the IM-5 molecular sieve has an average diameter of about 10-about 25 nm and an average aspect ratio of about 20-about 50.

5. A process of preparing the IM-5 molecular sieve according to claim 1, comprising:
 (1) mixing an alkali source, a templet agent, an aluminum source, water, a silicon source and a cationic surfactant to form a mixture, and stirring the mixture to generate a sol; and
 (2) heating the sol of step (1) at about 140-about 200 degrees C. for about 2-about 15 days to produce a solid material in the sol, separating the solid material from the sol, drying and calcinating the solid material to obtain the IM-5 molecular sieve of claim 1,
 wherein, in the mixture of step (1), a molar ratio of $R/SUR^+$ is about 5-about 20,
 wherein $SUR^+$ represents the cationic surfactant and R represents the templet agent.

6. The process according to claim 5, wherein in step (1), the mixture is stirred at a temperature about 20-about 70 degrees C. for about 1-about 24 hours.

7. The process according to claim 6, wherein in step (1), the mixture is stirred at a temperature about 55-about 65 degrees C. for about 3about 12 hours.

8. The process according to claim 5, wherein the templet agent R is 1,1'-(pentamethylene) bis(1-methylpyrrolidinium) bromide.

9. The process according to claim 5, wherein, in step (1), the aluminum source is aluminum nitrate, aluminum chloride, aluminum sulfate, or a combination thereof; the alkali source is sodium hydroxide, potassium hydroxide, lithium hydroxide, or a combination thereof; and the silicon source is white carbon, silicic acid, silanolate, silica sol, silica gel, or a combination thereof.

10. The process according to claim 5, wherein, in step (1), the cationic surfactant is a cationic quaternary ammonium salt having a carbon chain of 12-18 carbon atoms, and a corresponding negative ion thereof is a bromide ion or a chloride ion.

11. The process according to claim 5, wherein, in step (1), the cationic surfactant is cetyl trimethylammonium bromide, myristyl trimethylammonium bromide, or dodecyl trimethylammonium bromide.

12. The process according to claim 5, wherein in the mixture of step (1), a molar ratio of $SiO_2/Al_2O_3$ is about 40-about 70, a molar ratio of $R/SiO_2$ is about 0.15-about 0.4, wherein R represents the templet agent, and a molar ratio of $H_2O/SiO_2$ is about 30-about 70, a molar ratio of $OH^-/SiO_2$ is about 0.6-about 0.8.

13. The process according to claim 12, wherein the moler raito of $SiO_2/Al_2O_3$ is about 50-about 70, the molar ratio of $R/SiO_2$ is about 0.15-about 0.3, the molar ratio of $H_2O/SiO_2$ is about 40 to about 60, and the molar ratio of $OH/SiO_2$ is about 0.70-about 0.75.

14. The process according to claim 5, wherein, in step (2), the sol is heated at a temperature of about 160-about 185 degrees C.

15. The process according to claim 14, wherein, in step (2), the sol is heated at a temperature of about 165-about 175 degrees C.

16. The process according to claim 5, wherein, in step (2), the sol is heated for about 7-about 12 days.

17. The process according to claim 5, wherein the IM-5 molecular sieve of claim 1 has an average diameter of about 10-about 25 nm and an average aspect ratio of about 20-about 50.

18. The process according to claim 5, wherein the IM-5 molecular sieve of claim 1 has an average length of about 200-about 1250 nm.

19. The process according to claim 5, wherein, in the mixture of step (1), the molar ratio of $R/SUR^+$ is about 8-about 16.

* * * * *